United States Patent
Kleyman et al.

(10) Patent No.: US 11,343,176 B2
(45) Date of Patent: May 24, 2022

(54) INTERCONNECT ADDRESS BASED QOS REGULATION

(71) Applicant: Amazon Technologies, Inc., Seattle, WA (US)

(72) Inventors: Sergey Kleyman, Tel Aviv (IL); Adi Habusha, Moshav Alonei Abba (IL); Lior Podorowski, Tel Aviv (IL); Ofer Naaman, Hod Hasharon (IL)

(73) Assignee: Amazon Technologies, Inc., Seattle, WA (US)

( * ) Notice: Subject to any disclaimer, the term of this patent is extended or adjusted under 35 U.S.C. 154(b) by 234 days.

(21) Appl. No.: 16/450,837

(22) Filed: Jun. 24, 2019

(65) Prior Publication Data

US 2020/0403909 A1    Dec. 24, 2020

(51) Int. Cl.
| | |
|---|---|
| *H04L 12/00* | (2006.01) |
| *H04L 45/302* | (2022.01) |
| *H04L 45/745* | (2022.01) |
| *H04L 47/24* | (2022.01) |
| *H04L 67/568* | (2022.01) |
| *H04L 49/20* | (2022.01) |

(52) U.S. Cl.
CPC ........ *H04L 45/302* (2013.01); *H04L 45/7457* (2013.01); *H04L 47/2458* (2013.01); *H04L 67/2842* (2013.01); *H04L 49/205* (2013.01)

(58) Field of Classification Search
CPC ........ H04L 45/00; G06F 13/18; G06F 13/30; G06F 13/40; G06F 13/38; G06F 13/42; G06F 13/16; G06F 13/1626; G06F 13/1694; G06F 13/4009
See application file for complete search history.

(56) References Cited

U.S. PATENT DOCUMENTS

| | | | | |
|---|---|---|---|---|
| 2002/0143981 A1* | 10/2002 | DeLima | .................. | H04L 67/02 709/233 |
| 2012/0159088 A1* | 6/2012 | Balkan | ................ | G06F 13/1668 711/147 |

(Continued)

FOREIGN PATENT DOCUMENTS

WO    WO 2019/032740 A1    2/2019

OTHER PUBLICATIONS

PCT International Search Report and Written Opinion, dated Sep. 15, 2020, issued in PCT/US20/38221.

*Primary Examiner* — Abdelillah Elmejjarmi
(74) *Attorney, Agent, or Firm* — Weaver Austin Villeneuve & Sampson LLP

(57) ABSTRACT

In various implementations, provided are systems and methods for an integrated circuit including a completer device, a requester device, and an interconnect fabric. The requester device is configured to generate transactions to the completer device, where each transaction includes a request packet that includes an attribute associated with the completer device; and the interconnect fabric is coupled to the requester device and the completer device. The integrated circuit can also include a QoS regulator configured to identify, based on a first attribute associated with the completer device, a first QoS value establishing a first priority level for a first request packet generated by the requester device, and modify the first request packet to include the first QoS value.

17 Claims, 7 Drawing Sheets

(56) References Cited

U.S. PATENT DOCUMENTS

2013/0042249 A1* 2/2013 Jalal .................. H04L 47/70
                                                    718/103
2014/0376555 A1* 12/2014 Choi .................. H04L 49/70
                                                    370/395.53

* cited by examiner

INTERCONNECT ADDRESS BASED QOS REGULATION

BACKGROUND

An integrated circuit, such as a system on chip (SoC), can include various components, each being a specialized device that performs a specific function such as a central processing unit (CPU), graphics processing unit (GPU), an on-chip accelerator, input/output (IO) device, memory, and the like. Together, the various components can operate to perform a range of tasks wider than what is achievable by each component alone. To enable the components to operate together, the components can be implemented in an internal communication fabric so that the components, e.g., "nodes" in the fabric, can move data between one another. The communication fabric can include wiring and logic to efficiently move data across the SoC; and in some cases, the interconnect can include logic for optimizing the transfer of data, such as a cache memory.

BRIEF DESCRIPTION OF THE DRAWINGS

Various embodiments in accordance with the present disclosure will be described with reference to the drawings, in which.

DETAILED DESCRIPTION

Disclosed herein are techniques for improving the performance of integrated circuits, such as SoCs. SoCs can include a plurality of components that can operate together to perform a wide range of functions. Some components can be requester devices and some components can be completer devices, where the requester devices can be configured to perform various functions by instructing the completer devices. As an example, a requester device can be a processor and a completer device can be a memory device into which data can be written, and from which data can be read, by the processor. The processor can send request packets to read from and write into the memory device to execute an application to perform functions. Servicing of the request packets can be performed by an interconnect fabric that queues the request packets in a certain order according to their QoS values. The QoS values can be determined according to the identity of the source of the request packet (e.g., requester). In some situations, the SoC can include two different memory devices: a first memory device and a second memory device, where the first memory device can operate at a higher bandwidth and/or lower latency than the second memory device. In such situations, when request packets are sent to both memory devices, operation of the second memory device may degrade the performance of the first memory device, which can ultimately lead to a degradation of the performance of the SoC. According to certain aspects of the disclosure, QoS regulators can set a QoS value of each request packet based on its destination, rather than merely based on its source, to strategically route the request packet through an interconnect fabric between the requester devices and completer devices. Such completer-based QoS regulators can improve the utilization and latency of the completer devices, thereby improving the operation of the SoC as a whole.

In the following description, various embodiments will be described. For purposes of explanation, specific configurations and details are set forth in order to provide a thorough understanding of the embodiments. However, it will also be apparent to one skilled in the art that the embodiments may be practiced without the specific details. For instance, while the disclosure may refer to SoCs in certain embodiments, it is to be appreciated that the disclosure can apply to any integrated circuit that includes a requester and a completer without departing from the spirit and scope of the present disclosure. Furthermore, well-known features may be omitted or simplified in order not to obscure the embodiments being described.

Figure 1:
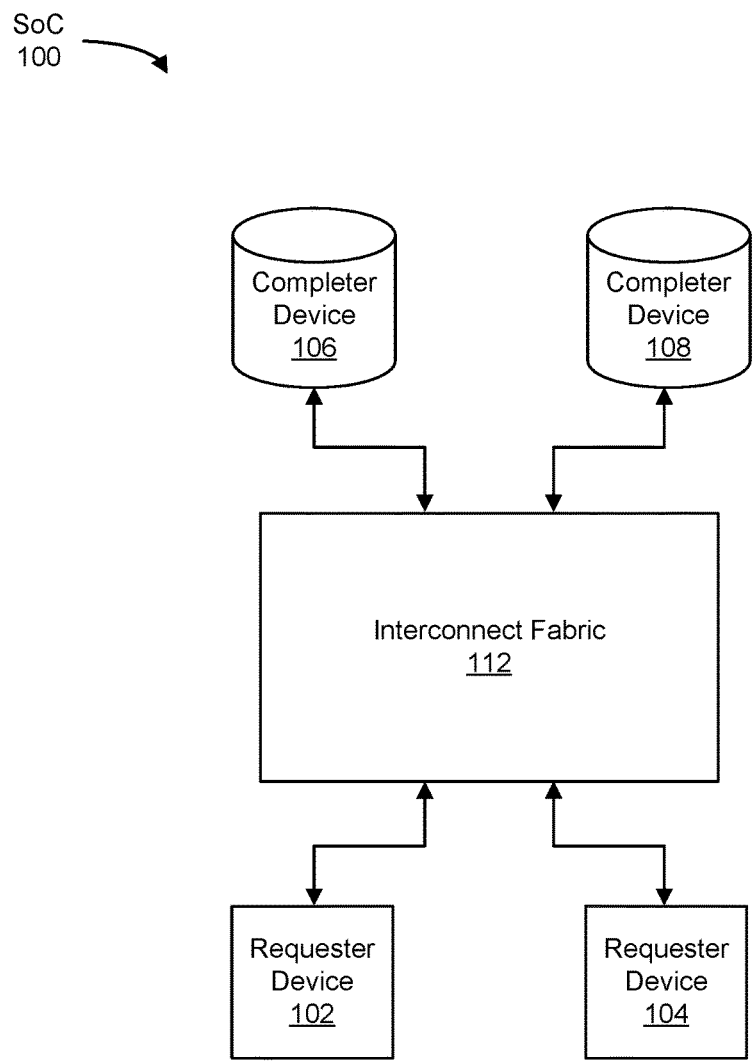
FIG. 1 illustrates an example of a system on chip (SoC) including requester devices and completer devices.

FIG. 1 illustrates an example of a SoC 100 including requester devices 102 and 104 and completer devices 106 and 108. In a scenario, requester devices 102 and 104 can be processors and completer devices 106 and 108 can be memory. Processors, which can also be referred to as central processing units (CPUs), can access memory resources to execute instructions that cause the processors to perform operations for executing software applications. SoC 100 can include one processor or multiple processors, where each processor is able to independently execute a set of instructions.

A single processor can have multiple processing cores, where each core can independently execute a set of instructions. A processing core is the computation engine of a processor, fetching instructions and data on every clock cycle, executing computations, outputting data, and making decisions about the next instructions to fetch. Having multiple processors and/or multiple processing cores provides a computer with one way to execute multiple applications at the same time. Thus, as shown in FIG. 1, requester devices 102 and 104 can each be individual processors or individual processing cores implemented in a single processor. Although FIG. 1 illustrates only two requester devices 102 and 104 and two completer devices 106 and 108, embodiments are not limited to such configurations. Other embodiments having more or less requester devices and/or completer devices are envisioned herein without departing from the spirit and scope of the present disclosure.

In addition to requester devices 102 and 104, SoC 100 can include other requester devices that can generate transactions to completer devices 106 and 108. For example, SoC 100 can include a graphics processing unit (GPU), a Remote Network Interface (RNI), a Serial Peripheral Interface (SPI), a General Purpose Input/Output (GPIO) interface, a Direct Memory Access unit, a custom component, or any other component that is able to generate transactions to memory (all of which are not shown in FIG. 1 for ease of discussion).

Memory devices, e.g., completer devices 106 and 108 in FIG. 1, can be memory devices used by a processor for temporary storage of data being used by or operated on by the processor, e.g., requester device 102 or 104 in FIG. 1. For example, sections of code for applications that are currently running can be stored in the memory device, while sections of code that are not immediately needed can be stored elsewhere, such as on a hard drive disk. As another example, a file that is being read from and/or written to can be temporarily stored in the memory device, until the read or write operations are done, at which point the file can be transferred to the hard drive disk. Such memory devices are often referred to as Dynamic Random Access Memory (DRAM) because they are often implemented using a DRAM-based technology, such as Double Data Rate (DDR) RAM or Synchronous DRAM (SDRAM), among others. Some other types of memory devices that can be used by a processor include storage class memory (SCM), high bandwidth memory (HBM), and other types of memory that have different operating characteristics.

To connect requester devices 102 and 104 to completer devices 106 and 108, the SoC can include an interconnect fabric 112 that provides avenues through which data can be transmitted between the requester devices and completer devices. Interconnect fabric 112 can include wiring and logic to efficiently move data between nodes across the SoC, as discussed further herein with respect to FIG. 2. Logic can include a hardware component, a software component, or a combination of both hardware and software components configured to perform one or more functions.

Figure 2:
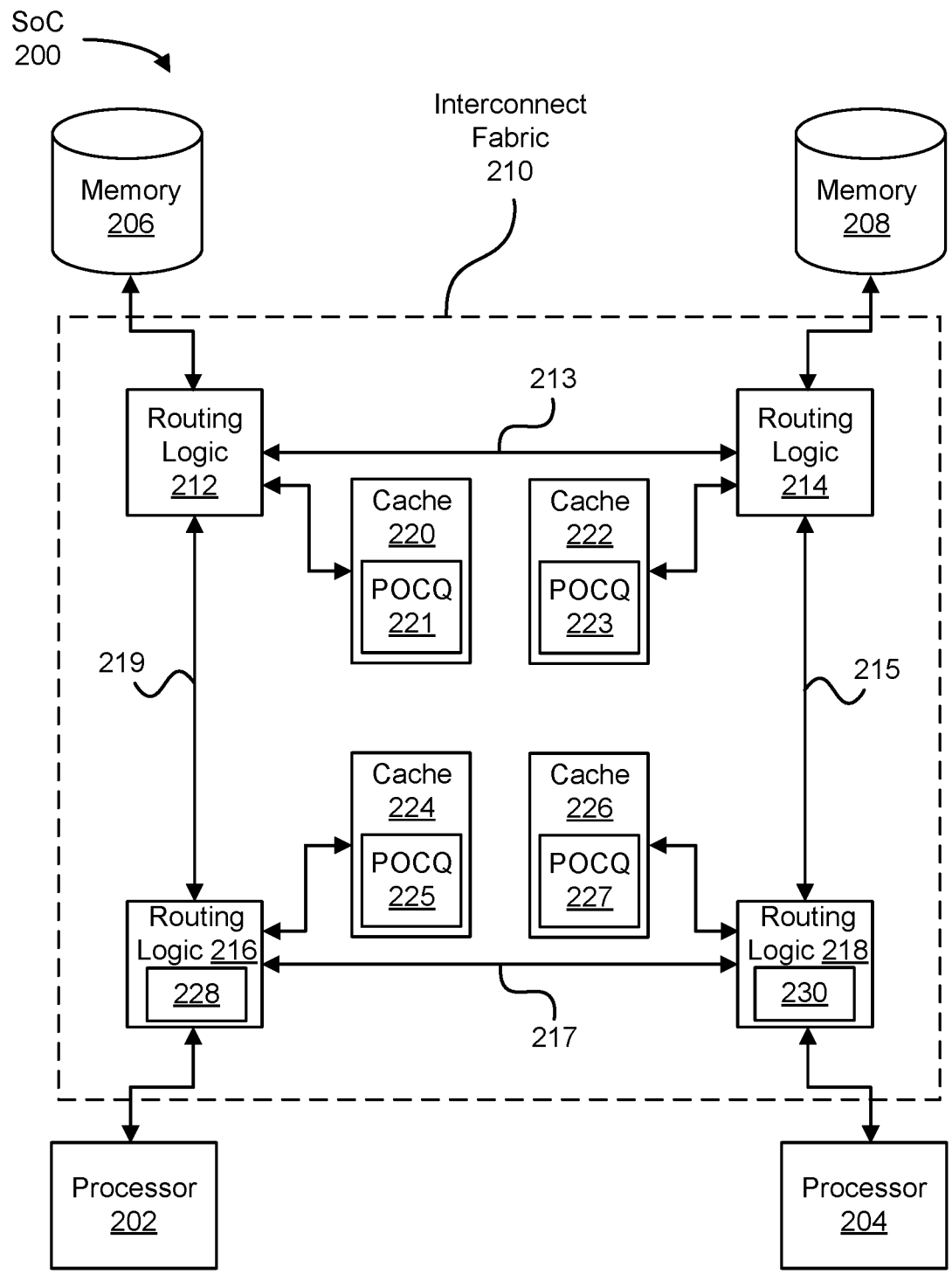
FIG. 2 illustrates an example of a SoC including processors (e.g., requester devices), memory (e.g., completer devices), and an interconnect.

FIG. 2 illustrates an example of a SoC 200 including processors 202 and 204 (e.g., requester devices), memory devices 206 and 208 (e.g., completer devices), and an interconnect fabric 210. Processors 202 and 204 and memory devices 206 and 208 can be substantially similar in configuration and operation to requester devices 102 and 104 and completer devices 106 and 108 discussed above with respect to FIG. 1. Details of such configuration and operation can thus be referenced in the discussion with respect to FIG. 1 and are not discussed herein for brevity.

In the example shown in FIG. 2, interconnect fabric 210 can be configured as a simple 2×2 mesh topology having four sets of routing logic 212, 214, 216, and 218 and four data lines 213, 215, 217, and 219 through which data can move between different sets of routing logic within interconnect fabric 210. In some cases, interconnect fabric 210 can implement a standardized bus protocol, such as Advanced Microcontroller Bus Architecture (AMBA) or a variant of AMBA, such as the Advanced Extensible Interface (AXI) variant or the Coherent Hub Interface (CHI) variant. In some instances, interconnect fabric 210 can also include logic for optimizing the transfer of data across sets of routing logic. For example, interconnect fabric 210 can include cache memory 220, 222, 224, and 226, each of which can store data most recently transmitted by processor 202 and/or processor 204. In this example, when cache memory 220, 222, 224, and 226 has data that is to be written to or read from memory device 206 or 208, interconnect fabric 210 can provide the data from cache memory 220, 222, 224, and 226 instead of reading the data from processor 202 when writing to memory device 206.

Cache memory 220, 222, 224, and 226 together can form a distributed shared last-level cache (SLC). Each cache memory 220, 222, 224, or 226 can be a respective portion of the SLC that is responsible for an exclusive set of system memory address. Although interconnect fabric 210 is shown as having a simple 2×2 mesh topography, it is to be appreciated that any other mesh topography size can be used without departing from the spirit and scope of the present disclosure.

In some instances, interconnect fabric 210 can offer end-to-end QoS mechanisms for strategically routing data traffic through its fabric to improve performance. As an example, interconnect fabric 210 can include QoS regulators 228 and 230 within certain sets of routing logic in the fabric, e.g., sets of routing logic 216 and 218 that are coupled to processors 202 and 204, respectively. QoS regulators 228 and 230 can seek to prevent congestion of interconnect fabric 210 by controlling the influx of transactions from processors 202 and 204. In some cases, each processor 202 or 204 can assign QoS values to their request packets in an attempt to influence the arbitration priority at each decision point throughout interconnect fabric 210 to prioritize the movement of their request packet over others. In other cases, QoS regulators 228 and 230, instead of processors 202 and 204, can set a QoS value to each incoming transaction.

Cache memory 220, 222, 224, and 226 can be configured to function as a Point of Coherency Queue (POCQ) for a specific system address range or set that services requests in a sequential order. Thus, since each cache memory 220, 222, 224, or 226 is a portion of a distributed SLC, each cache memory 220, 222, 224, or 226 can also include a respective portion of the POCQ. Accordingly, cache memory 220, 222, 224, and 226 can each include a respective portion 221, 223, 225, and 227 of the POCQ, as shown in FIG. 2. Request packets moving through the interconnect fabric can occupy entries in the POCQ so that it can be distributed to its destination, e.g., target completer. Those request packets can occupy entries in a queue in the POCQ in a certain sequential order so that when one request packet is completed by its target completer, a new entry can take its place. In some instances, occupancy availability for entry into the queue can depend on its priority, which can be influenced by a QoS value. As an example, for a 32 entry queue ranging from entries 0-31, a request packet with a low QoS value can only occupy lower level entry vacancies in the queue (e.g., entries 0-16), whereas a request packet with a high QoS value can occupy higher level entries in the queue (e.g., entries 17-31) in addition to the lower level entries (e.g., entries 0-16). The request packets having higher QoS values are thus given priority to fill vacant entries in the queue so that they may get routed to the completer before request packets having lower QoS values. In some embodiments, the QoS value for a request packet can be set based on the requester device from which the request packet is generated. According to certain embodiments, the QoS value for a request packet can alternatively or additionally be set based on the completer device to which the request packet is sent rather than merely based on the requester device from which the request packet is generated to improve the utilization and latency of completer devices within the SoC, as will be discussed in detail further herein.

How the QoS regulator assigns the occupancy level of the request packet can be based on its operation mode. Some QoS regulators have two operation modes: (1) latency operation mode and (2) period (bandwidth) regulation mode. Latency is the time between initiating a request for a byte or word in memory until it is retrieved by a processor, and bandwidth is the rate at which data can be read from or stored into memory. In the latency operation mode, the QoS regulators set the QoS field to achieve low latency, while in the period regulation mode, the QoS regulators set the QoS field to achieve high bandwidth. Such QoS regulators are also requester-based QoS regulators, meaning they are configured to assign priority values based on the requester device's type of device or identity. Accordingly, requester-based QoS regulators can assign higher priority to transactions from certain processors that need more memory resources, such as higher speed processors. Requester devices may, by default to achieve the highest priority for their transactions, assign each transaction with the highest priority, which can result in all of the transactions having the same QoS value. Or, the QoS regulators may assign the same QoS values to two different requester devices based on their type of device. Transactions having the same QoS values may have their data traffic processed on a round-robin basis, which may result in an under-utilization one or more completer devices when memory resources are not appropriately allocated.

For instance, memory devices 206 and 208 may be different types of memory devices and thus have different bandwidth and latency operational characteristics. That is, memory device 206 can be a first type of memory device that can operate at a higher bandwidth and/or lower latency than memory device 208, which can be a second type of memory device different from the first type of memory device. Such situations can be referred to as "hybrid memory models" where some memory devices are lower class memory devices for cost-per-volume and performance optimization purposes. Having memory devices of different memory classes in an SoC can cause request packets that are distributed to different memory devices to mix in the POCQ, which can cause congestion in the POCQ and thus degrade the performance of one or more of the memory devices.

This concept can be better understood with reference to a specific scenario in which traffic from one requester device is distributed between multiple completer devices, while traffic from another requester device is distributed solely to one of the multiple completer devices, which results in a POQC having a mixture of request packets intended for different memory devices. For instance, with reference to FIG. 2 where memory device 206 can operate at a higher bandwidth and/or lower latency than memory device 208, traffic from processor 202 can be distributed between memory devices 206 and 208 while traffic from processor 204 can be solely distributed to memory device 206. Accordingly, request packets from processor 202 that are intended for memory device 208 can occupy entries in the POCQ implemented in the distributed SLC including cache memory 220, 222, 224, and 226. And, request packets from processor 204 that are intended for memory device 206 may also occupy entries in the POCQ. In situations where the QoS values of the request packets from both processors 202 and 204 are determined according to requester-based QoS regulation, all of the request packets may have the same priority and thus entries may be evenly occupied by request packets regardless of the completer to which the request packets are intended to be distributed. Accordingly, if memory device 208 is busy and the next entry for servicing in the POCQ is to be distributed to memory device 208, movement of other entries in cache memory 222 that are intended for memory device 206 will be delayed as memory device 208 is not ready for the next entry. This delay can cause memory device 206 to be under-utilized and cause unnecessary increases in its latency, which can in turn degrade the performance of memory device 206 and ultimately the performance of SoC 200 as a whole. Requester-based QoS regulators 228 and 230 operating in either latency operation mode or bandwidth regulation mode will not be able to remedy the situation because the modification of priority based on latency or bandwidth will have the same effect on both completer device streams.

Thus, according to certain aspects of the disclosure, QoS regulators can be configured to be completer-based instead of requester-based to adjust QoS values of request packets based on a target completer device rather than the requester device. In other words, completer-based QoS regulators can adjust priority based on where the request packets are to be sent rather than where they are sent from. Such QoS regulators can thus manage the flow of data traffic to maximize the utilization and/or minimize the latency of the completer devices, and thus improve the operation of the SoC as a whole.

Figure 3:
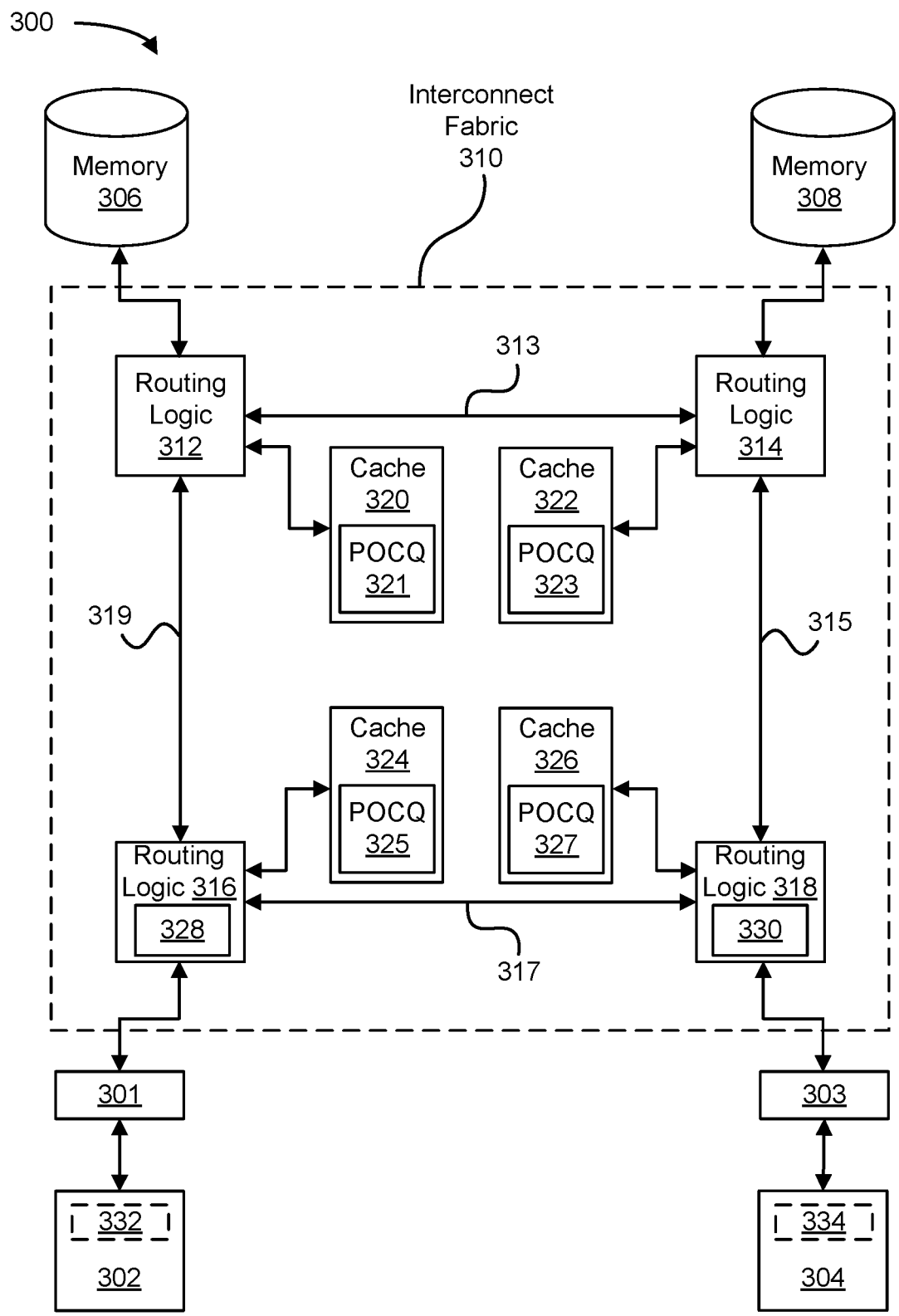
FIG. 3 illustrates an example of a SoC having completer-based Quality of Service (QoS) regulators for assigning QoS values to request packets based on a target completer device, according to certain aspects of the disclosure.

FIG. 3 illustrates an example of a SoC 300 having completer-based QoS regulators 301 and 303 for assigning QoS values to request packets based on a target completer device, according to certain aspects of the disclosure. SoC 300 can include processors 302 and 304 (e.g., requester devices), memory devices 306 and 308 (e.g., completer devices), and an interconnect fabric 310. Processors 302 and 304 and memory devices 306 and 308 can be substantially similar in configuration and operation to processors and memory devices discussed herein with respect to FIG. 1. And, interconnect fabric 310, which can include sets of routing logic 312, 314, 316, and 318 and data lines 313, 315, 317, and 319, can be substantially similar in configuration and operation to interconnect fabric 210 discussed herein with respect to FIG. 2. Thus, details of the configuration and operation of these components can thus be referenced in the discussion with respect to FIGS. 1 and 2 and are not discussed herein for brevity.

In some embodiments, completer-based QoS regulators 301 and 303 can be configured to set/modify a QoS value according to a target completer device. For example, QoS regulators 301 and 303 can be configured to modify the QoS value of request packets from processors 302 and 304 based on whether the request packets will be distributed to memory device 306 or memory device 308. Since memory device 306 is a first type of memory and memory device 308 is a second type of memory device having a lower bandwidth and higher latency than the first type of memory device (as continued from the example discussed with respect to FIG. 2), QoS regulators 301 and 303 can be configured to assign QoS values for request packets distributed to memory device 306 from processors 302 and 304 that are higher in priority than QoS values for request packets distributed to memory device 308. That way, the utilization and latency of memory device 306, which can operate at a higher bandwidth and/or lower latency, can be realized instead of being limited, which may occur in an SoC with requester-based QoS regulators. Accordingly, the operation of the SoC can be improved. QoS regulators 301 and 303 can be configured to modify the QoS value depending on various attributes of the request packet, such as the target address, page, and node identity (NODEID), as will be discussed further herein with respect to FIG. 4.

Completer-based QoS regulators can be integrated at the requester-end of an interconnect fabric to intercept transactions generated by the requester devices so that QoS values can be set/modified to reflect priorities based on the target completer device before entering the interconnect fabric. For instance, QoS regulators 301 and 303 shown in FIG. 3 can be individual components separate from interconnect fabric 310 that are positioned between interconnect fabric 310 and processors 302 and 304. Transactions generated by processors 302 and 304 can be intercepted by QoS regulators 301 and 303, who can then set/modify the QoS values of the request packets according to the target completer device to which the transactions are distributed. QoS regulators 301 and 303 can set the QoS values in instances where processors 302 and 304 are not QoS aware (meaning they do not assign their own QoS values to their transactions), or modify the QoS values of prior QoS values in instances where processors 302 and 304 are QoS aware (meaning they do assign their own QoS values to their transactions).

In additional or alternative embodiments, completer-based QoS regulators can optionally be integrated within the requester device itself and thus set/modify the QoS value before a transaction is distributed to the interconnect fabric. For instance, QoS regulators 332 and 334 shown in FIG. 3 can be components that are integrated within processors 302 and 304. In such instances, transactions generated by processors 302 and 304 can have their QoS values set/modified according to the target completer device to which the transactions are distributed before the request packet is outputted to interconnect fabric 310. In such embodiments, QoS regulators 328 and 330 in sets of routing logic 316 and 318 can simply relay the request packets into interconnect fabric 310 without modifying the QoS values further.

Completer-based QoS regulators according to certain aspects of the disclosure can be a set of logic on a chip that is configured to perform functions for modifying QoS values based on a target completer device. Accordingly, such QoS regulators can include sub-sets of logic that perform separate tasks that, when combined, achieve the functionality of completer-based QoS regulation. A more detailed discussion of the logic within completer-based QoS regulators is discussed herein with respect to FIG. 4.

Figure 4:
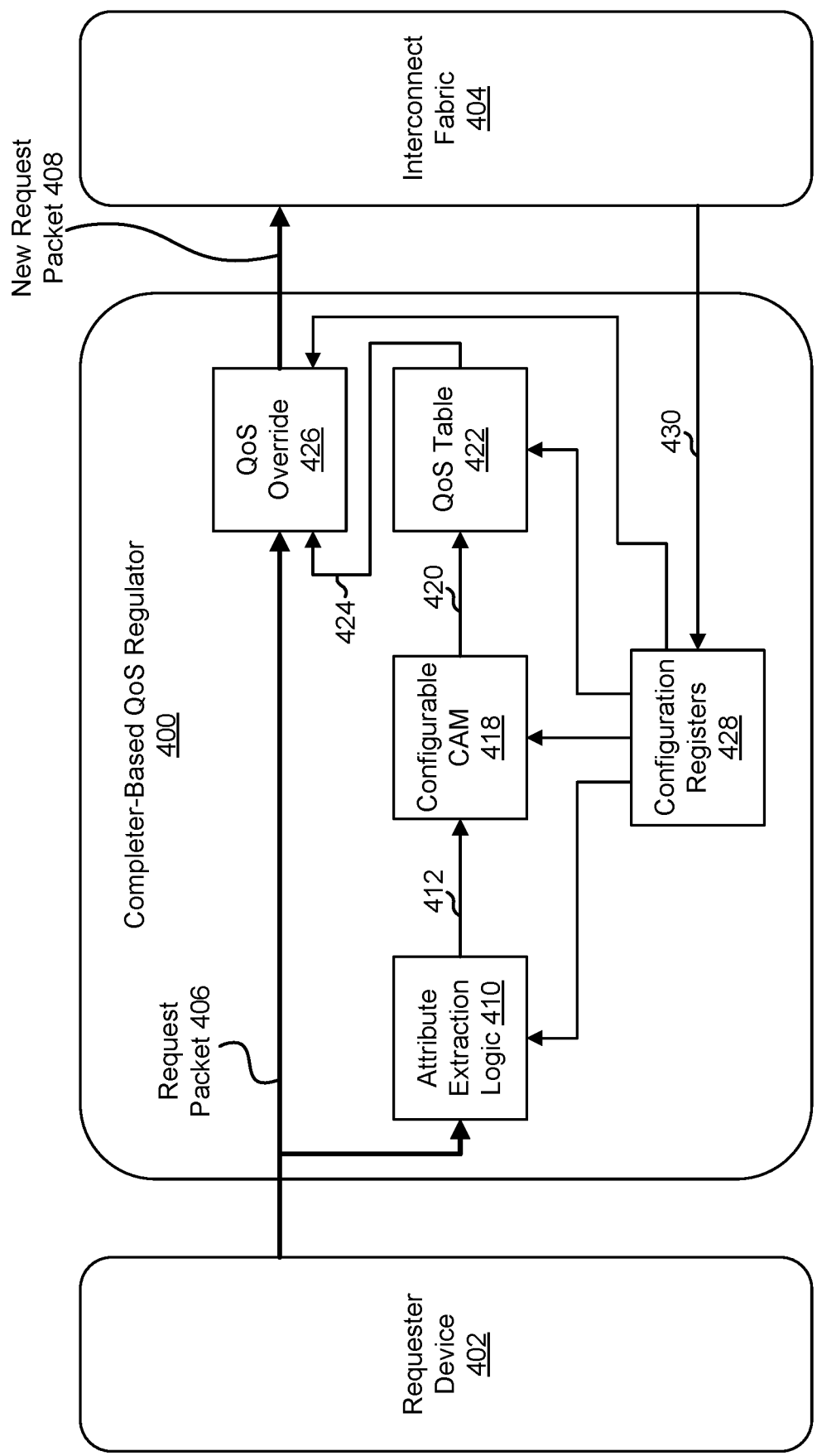
FIG. 4 illustrates logic within an example of a completer-based QoS regulator coupled between a requester device and an interconnect fabric, according to certain aspects of the disclosure.

FIG. 4 illustrates logic components within an example of a completer-based QoS regulator 400 coupled between a requester device 402 and an interconnect fabric 404, according to certain aspects of the disclosure. Requester device 402 can, as part of a transaction, generate a request packet 406 for distribution to a completer device (not shown for simplicity). Request packet 406 can be received by completer-based QoS regulator 400 which modifies its QoS value and outputs a new request packet 408 to interconnect fabric 404. New request packet 408 can be request packet 406 but with a new QoS value. Once new request packet 408 is received, interconnect fabric 404 can move new request packet 408 to the appropriate completer device according to a new priority based on the new QoS value.

In some embodiments, QoS regulator 400 can include attribute extraction logic 410 that is configured to receive request packet 406 from requester device 402 and identify and extract attribute(s) 412 within request packet 406. Some examples of an attribute that can be identified and extracted are an original QoS value (if any) of the request packet 406, a memory address of a completer device to which request packet 406 is intended to be sent, and user-defined reserve bits. According to certain aspects of the disclosure, the user-defined reserve bits for request packet 406 can be defined in a way that helps QoS regulator 400 identify the destination, e.g., the completer device, to which request packet 406 is sent. For example, using a standard virtual to physical page translation architecture, the user-definable reserve bits can be an attribute in each page descriptor in the memory management unit (MMU) of a processor (e.g., requester device 402) that provides a hint to QoS regulator 400 for identifying the type of memory to which request packet 406 is sent. Table 1 below shows one example of how the attribute (e.g., "page_descriptor_mem_attr[1:0]", or "page attribute" herein) can be associated with different memory types.

TABLE 1

| page_descriptor_mem_attr[1:0] | Memory Type |
|---|---|
| 00 | DRAM (default) |
| 01 | Storage Class Memory (SCM) |
| 10 | High Bandwidth Memory (HBM) |
| 11 | Memory-Mapped Input/Output (IO) |

That is, the "00" page attribute can be associated with DRAM and be the default page attribute when no specific page attribute is selected. The "01" page attribute can be associated with SCM, which may be slower than DRAM but be persistent memory, meaning its content is preserved during a power cycle. The "10" page attribute can be associated with HBM, which may have a higher bandwidth than SCM and use less power. The "11" page attribute can be associated with memory-mapped IO.

The extracted attributes can be outputted to a configurable content addressable memory (CAM) 418 or a register-based matching logic, which may function as a high-speed lookup table that can output a value based on search data. For instance, each additional attribute shown in Table 1 can be linked to a specific entry number; and, when attribute(s) 412 is received, configurable CAM 418, can use one or more of those attributes to identify an entry number linked to those one or more attributes, and then output the identified entry number as entry number 420. For example, with brief reference to FIG. 3, memory device 306 can be linked to page attribute "00" and memory device 308 can be linked to page attribute "01". Thus, in instances where request packet 406 is sent to memory device 306, request packet 406 can include attribute(s) 412, such as a destination memory address, page attribute, original QoS value, and user bits, where the page attribute is "00". Attribute extraction logic 410 can identify and extract the page attribute and send it to configurable CAM 418, which uses the page attribute to identify and output an entry number, e.g., entry number 420, corresponding to page attribute "00". Although embodiments disclose a configurable CAM for identifying an entry number based on extracted attribute(s), embodiments are not so limited. Any suitable configurable logic for matching data with an entry table can be used without departing from the spirit and scope of the present disclosure, such as logic including registers and comparators.

Any of the extracted attributes from attribute extraction logic 410 can be used as search data for configurable CAM 418. In particular, those extracted attributes that can identify the identity of the completer device may be used as search data, such as the NODEID, memory address or page attribute of a completer device to which request packet 406 is intended to be sent. In some cases, more than one extracted attribute can be used to identify an entry number. For instance, the NODEID, the memory address attribute, and the page attribute can all be used together to determine an entry number. By using more than one attribute to identify the entry number, completer-based QoS regulator can more accurately assign a new priority to request packet 406.

In some embodiments, configurable CAM 418 can output entry number 420 to a QoS table 422, which can be a lookup table that holds several new QoS values in an entry list. Each QoS value can be in a specific entry of QoS table 422 so that the entry number that identifies the specific entry can be used to identify the specific QoS value in that entry. Thus, when attribute extraction logic 410 extracts the page attribute from request packet 406 and configurable CAM 418 identifies and outputs entry number 420 associated with the page attribute to QoS table 422, the page attribute is effectively used to identify a new QoS value in QoS table 422. Because the page attribute, or any other extracted attribute discussed herein, identifies a completer device, the new QoS values can therefore be linked to the type of completer device to which a request packet is sent. Table 2 below lists the new QoS values for the respective page attributes of request packet 406 based on Table 1.

TABLE 2

| page_descriptor_mem_attr[1:0] | New QoS Value [3:0] |
|---|---|
| 00 | 0xE |
| 01 | 0x7 |
| 10 | 0xA |
| 11 | Original QoS Value |

Accordingly, request packets including page attribute "00", which is associated with a DRAM memory type as shown in Table 1, can be linked to a new QoS value of 0xE; request packets including page attribute "01", which is associated with a SCM memory type, can be linked to a new QoS value of 0x7; request packets including page attribute "10", which is associated with a HBM memory type, can be linked to a new QoS value of 0xA; and request packets including page attribute "11", which is associated with a IO memory type, can be linked to the original QoS value. The new completer-based QoS values can assign higher priorities for request packets distributed to memory types that have higher bandwidth and/or lower latency. Therefore, request packets distributed to DRAM memory types can have the highest QoS value of 0xE, followed by HBM and then SCM memory types.

This concept can be better understood with discussion of an example scenario and with reference to FIGS. 3 and 4. In this scenario, memory device 306 is DRAM and memory device 308 is SCM, and QoS table 422 in FIG. 4 includes four entries having sequential entry numbers 1-4 that hold the four QoS values in Table 2 where QoS value 0xE is in entry number 1 and the original QoS value is in entry number 4. Thus, request packets distributed to memory device 306 can include page attribute "00" and be linked to entry number 1 of QoS table 422, and request packets distributed to memory device 308 can include page attribute "01" and be linked to entry number 2 of QoS table 422. Because memory device 308 operates at a lower bandwidth and/or higher latency than memory device 306, request packets distributed to memory device 306 can be set with a QoS value of 0xE and request packets distributed to memory device 308 can be set with a QoS value of 0x7. Request packets distributed to memory device 306 can thus have access to greater occupancies in the POCQ so that they can be quickly distributed to the higher class memory without delay caused by mixed request packets in the POCQ as discussed herein with respect to FIG. 2.

Although FIG. 4 illustrates attribute extraction logic 410, configurable CAM 418, and QoS table 422 as separate logic components, embodiments are not limited to such configurations. In some embodiments, configurable CAM 418 and QoS table 422 can be integrated into a single logic component. In some embodiments, QoS table 422 can be stored in configurable CAM 418. Additionally or alternatively, attribute extraction logic 410 can be integrated with configurable CAM 418, or attribute extraction logic 410, configurable CAM 418, and QoS table 422 can all be integrated into a single logic component. It is to be appreciated that any combination of the components can be integrated together without departing from the spirit and scope of the present disclosure.

With reference to FIG. 4, QoS table 422 can output the identified completer-based QoS value as new QoS value 424 to a QoS override logic 426. In some embodiments, QoS override logic 426 receives request packet 406 and new QoS value 424 and replaces the original QoS value in request packet 406 with new QoS value 424 to create new request packet 408. Once the original QoS value is replaced with new QoS value 424, new request packet 408 can be outputted to interconnect fabric 404, which can then route new request packet 408 through interconnect fabric 404 according to its new priority established by new QoS value 424. In embodiments where requester device 402 is QoS unaware, QoS override logic 426 can set, rather than modify, a QoS value for the request packet 406 according to new QoS value 424.

In some embodiments, completer-based QoS regulator 400 can also include a set of configuration registers 428 that is coupled to interconnect fabric 404 via a configuration bus 430. Configuration registers 428 can be a series of registers that control the operations of the SoC. In some implementations, one or more bits in configuration register 428 can represent certain capabilities of the SoC. The data representing the configuration of the SoC can be programmed by instructions executing in requester device 402, and/or by an external entity, such as a host device, an operating system executing on a host device, and/or a remote device coupled to interconnect fabric 404 via a configuration bus 430.

As shown in FIG. 4, completer-based QoS regulator 400 can be separate from and external to requester device 402, and it can be positioned to intercept request packets from requester device 402. In such configurations, completer-based QoS regulator 400 can be easily implemented in SoC designs, e.g., by inserting regulator 400 in the data line between the requester device and the interconnect fabric. Although FIG. 4 illustrates completer-based QoS regulator 400 as separate and external to requester device 402, embodiments are not so limited. In some instances, completer-based QoS regulator can be integrated in requester device 402 so that outputs of requester device 402 can be new request packet 408 instead of request packet 406 as shown in FIG. 4. In such embodiments, requester device 402 can identify an original QoS value for a request packet and internally modify the original QoS value with the completer-based QoS regulator before a request packet is outputted by the requester device. That way, request packets outputted by requester device 402 can already have the new QoS value and thus have priority levels based on their destination rather than their source. In some other embodiments, the functionality of completer-based QoS regulator 400 can be integrated in existing QoS regulators in the interconnect fabric, e.g., QoS regulators 228 and 230 in FIG. 2. In such embodiments, QoS regulators 228 and 230 can be programmed to help assign QoS values based on the completer device instead of the requester device, as discussed herein. For example, QoS regulators 228 and 230 can be programmed to be a mixed regulator that can perform completer-based QoS regulation of request packets as well as latency and/or bandwidth QoS regulation. Such QoS regulators can permit a range of QoS values for each completer and perform latency and/or bandwidth regulation within that permitted range for the respective completer.

Method

Figure 5:
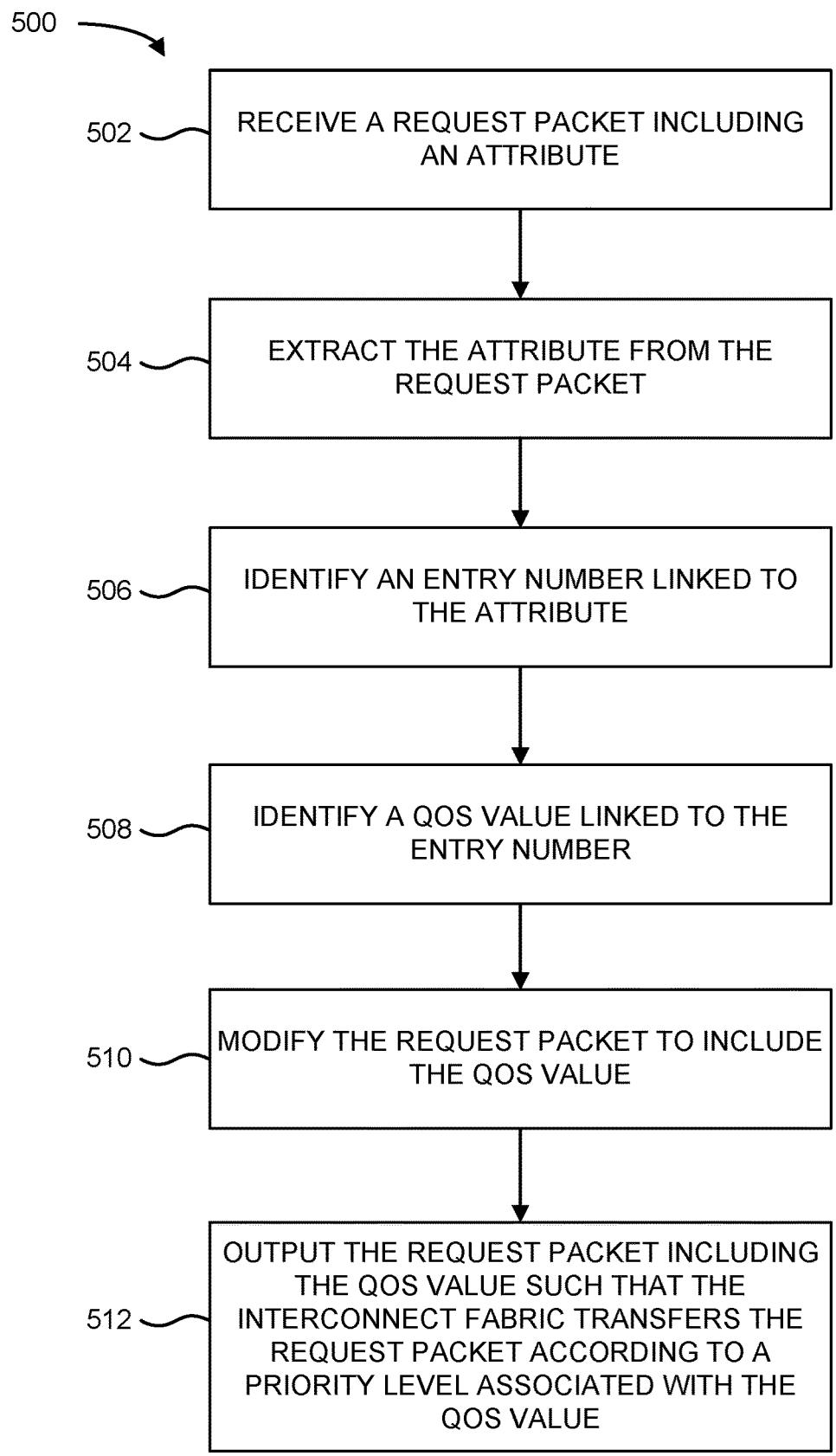
FIG. 5 illustrates a flow diagram of an example of a method 500 for completer-based QoS regulation by a completer-based QoS regulator, according to certain aspects of the disclosure.

FIG. 5 illustrates a flow diagram of an example of a method 500 for completer-based QoS regulation by a completer-based QoS regulator, according to certain aspects of the disclosure. At block 502, a request packet including an attribute can be received. In some embodiments, an attribute extraction logic, e.g., logic 410 of completer-based QoS regulator 400 in FIG. 4, can receive the request packet, e.g., request packet 406, and the attribute can be any of a memory address attribute, page attribute, NODEID, original QoS value, and user bits discussed herein with respect to FIG. 4. In embodiments where the requester device is QoS aware, the request packet can include an original QoS value that may be associated with a priority based on the requester device.

At block 504, the attribute from the request packet can be identified and extracted. For instance, the memory address attribute, page attribute and/or the original QoS value can be identified and extracted from the request packet. In some embodiments, the attribute can be identified and extracted by the attribute extraction logic, which can then output the extracted attributes to a configurable CAM. The memory address attribute and page attribute can be associated with a specific memory type, as discussed herein with respect to FIGS. 3 and 4.

At block 506, an entry number linked to the attribute can be identified. For instance, the configurable CAM, e.g., configurable CAM 418 in FIG. 4, can receive a page attribute and use the page attribute as search data to identify the entry number linked to the page attribute, as discussed herein with respect to FIG. 4. Then, at block 508, a QoS value linked to the entry number can be identified. As an example, a QoS table, e.g., QoS table 422 in FIG. 4, can receive the entry number and identify a QoS value linked to the entry number. The QoS value can be associated with a priority level that is based on the completer device to which it is distributed instead of the requester device from which it is sent so that the new priority level associated with the QoS value can direct traffic according to the unique capabilities of the completer devices, e.g., memory devices 306 and 308, as discussed herein with respect to FIG. 4.

At block 510, the request packet can be modified to include the QoS value so that the request packet can have a priority level that is completer-based instead of requestor-based. In instances where the requester device is not QoS aware, modifying the request packet can be performed by inserting a QoS value in the request packet. Whereas in instances where the requester device is QoS aware, modifying the request packet can be performed by deleting the original QoS value and replacing it with the new completer-based QoS value. In some embodiments, a QoS override logic, e.g., QoS override logic 426 in FIG. 4, can modify the QoS value in the request packet. In such cases, the QoS override logic can be configured to receive the request packet as well as the QoS value so that the request packet can be modified with the QoS value. The QoS override logic can then, at block 512, output the modified request packet with the QoS value to an interconnect fabric, e.g., interconnect fabric 310 or 404 discussed herein with respect to FIGS. 3 and 4, respectively, such that the interconnect fabric transfers the request packet according to the first priority level. The QoS value can modify the movement priority of the request packet through the interconnect fabric in the SoC so that the utilization and latency of certain completer devices, which can be memory that operates at a higher bandwidth and/or lower latency than other completer devices, can be realized instead of being limited by mixed traffic, which may occur in an SoC with requester-based QoS regulators as aforementioned herein.

Computing Systems

Figure 6:
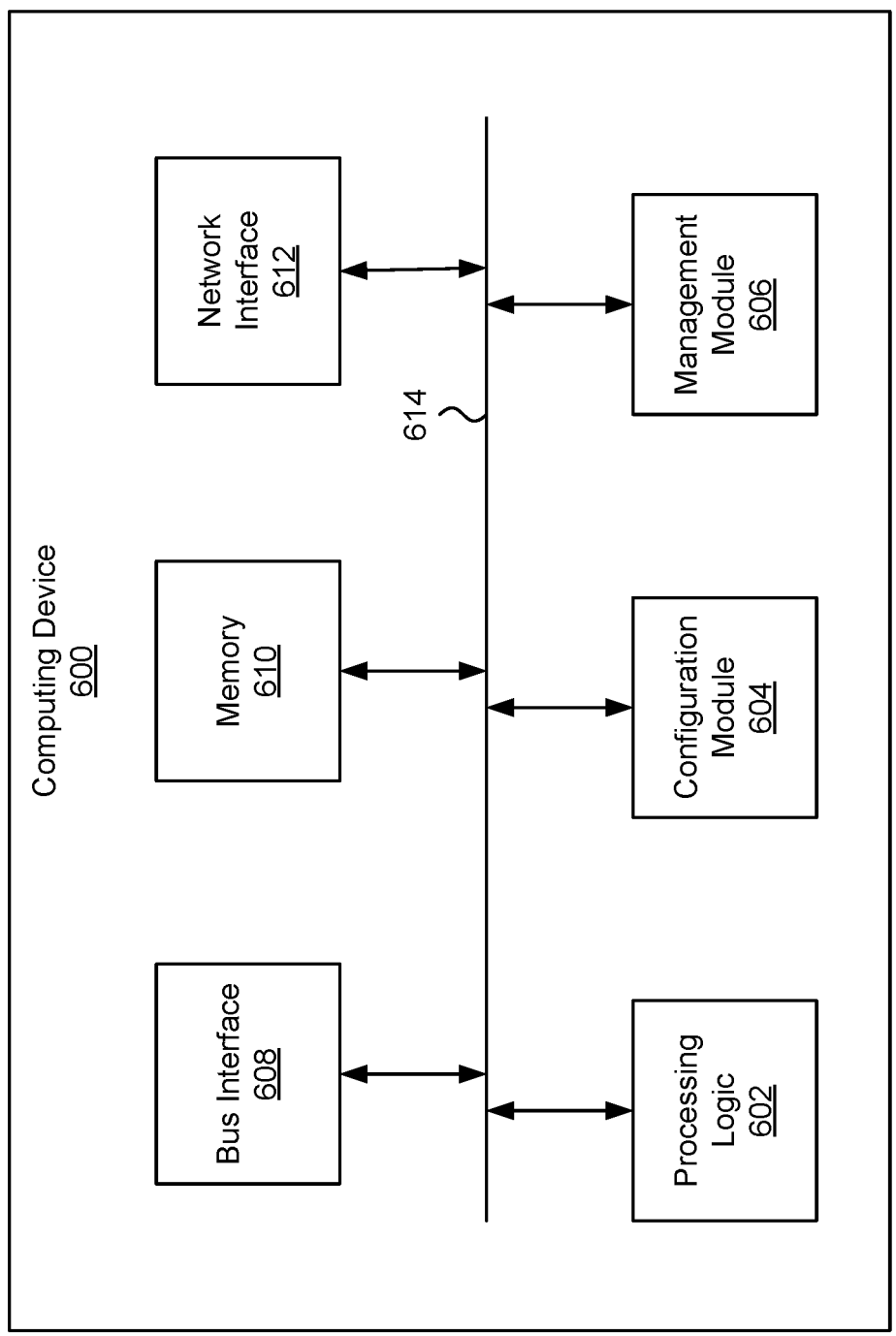
FIG. 6 illustrates an example of a computing device, according to certain aspects of the disclosure.

FIG. 6 illustrates an example of a computing device 600. In some embodiments, computing device 600 can be a SoC that includes one or more completer-based QoS regulators discussed herein. Thus, functionality and/or several components of the computing device 600 may be used without limitation with other embodiments disclosed elsewhere in this disclosure, without limitations.

In one example, the computing device 600 may include processing logic 602, a configuration module 604, a management module 606, a bus interface module 608, memory 610, and a network interface module 612. These modules may be hardware modules, software modules, or a combination of hardware and software. In certain instances, modules may be interchangeably used with components or engines, without deviating from the scope of the disclosure. The computing device 600 may include additional modules, not illustrated here, such as components discussed with respect to the nodes disclosed in FIG. 7. In some implementations, the computing device 600 may include fewer modules. In some implementations, one or more of the modules may be combined into one module. One or more of the modules may be in communication with each other over a communication channel 614. The communication channel 614 may include one or more busses, meshes, matrices, fabrics, a combination of these communication channels, or some other suitable communication channel. In some instances, communication channel 614 can be interconnect fabric 310 or 404 discussed herein with respect to FIGS. 3 and 4.

The processing logic 602 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 602 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 602 may be stored on a computer-readable storage medium, for example, in the form of a computer program. The computer-readable storage medium may be non-transitory. In some cases, the computer-readable medium may be part of the memory 610. According to certain aspects of the disclosure, a completer-based QoS regulator (not shown in FIG. 6) can be coupled between processing logic 602 and communication channel 614 to intercept request packets sent by processing logic 602 into communication channel 614. Alternatively, the completer-based QoS regulator can be integrated into processing logic 602. By implementing the completer-based QoS regulator into computing device 600, request packets outputted from processing logic 602 can be inputted into communication channel 614 with new QoS values that set the priority levels of the request packets based on their destination rather than their source.

The memory 610 may include either volatile or non-volatile, or both volatile and non-volatile types of memory. The memory 610 may, for example, include random access memory (RAM), read only memory (ROM), Electrically Erasable Programmable Read-Only Memory (EEPROM), flash memory, and/or some other suitable storage media. In some cases, some or all of the memory 610 may be internal to the computing device 600, while in other cases some or all of the memory may be external to the computing device 600. The memory 610 may store an operating system comprising executable instructions that, when executed by the processing logic 602, provides the execution environment for executing instructions providing various functionality for the computing device 600. The memory may also store and maintain several data structures and routing tables for facilitating the functionality of the computing device 600. Memory 610 can include memory devices 306 and 308 discussed herein with respect to FIG. 3.

In some implementations, the configuration module 604 may include one or more configuration registers. Configuration registers may control the operations of the computing device 600. In some implementations, one or more bits in the configuration register can represent certain capabilities of the computing device 600. Configuration registers may be programmed by instructions executing in the processing logic 602, and/or by an external entity, such as a host device, an operating system executing on a host device, and/or a remote device. The configuration module 604 may further include hardware and/or software that control the operations of the computing device 600.

In some implementations, the management module 606 may be configured to manage different components of the computing device 600. In some cases, the management module 606 may configure one or more bits in one or more configuration registers at power up, to enable or disable certain capabilities of the computing device 600. In certain implementations, the management module 606 may use processing resources from the processing logic 602. In other implementations, the management module 606 may have processing logic similar to the processing logic 602, but segmented away or implemented on a different power plane than the processing logic 602.

The bus interface module 608 may enable communication with external entities, such as a host device and/or other components in a computing system, over an external communication medium. The bus interface module 608 may include a physical interface for connecting to a cable, socket, port, or other connection to the external communication medium. The bus interface module 608 may further include hardware and/or software to manage incoming and outgoing transactions. The bus interface module 608 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 608 may include the physical layer for any of these bus protocols, including a connector, power management, and error handling, among other things. In some implementations, the computing device 600 may include multiple bus interface modules for communicating with multiple external entities. These multiple bus interface modules may implement the same local bus protocol, different local bus protocols, or a combination of the same and different bus protocols.

The network interface module 612 may include hardware and/or software for communicating with a network. This network interface module 612 may, for example, include physical connectors or physical ports for wired connection to a network, and/or antennas for wireless communication to a network. The network interface module 612 may further include hardware and/or software configured to implement a network protocol stack. The network interface module 612 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 600 may include multiple network interface modules, each configured to communicate with a different network. For example, in these implementations, the computing device 600 may include a network interface module for communicating with a wired Ethernet network, a wireless 802.11 network, a cellular network, an Infiniband network, etc.

The various components and modules of the computing device 600, described above, may be implemented as discrete components, as a SoC, as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 7.

Figure 7:
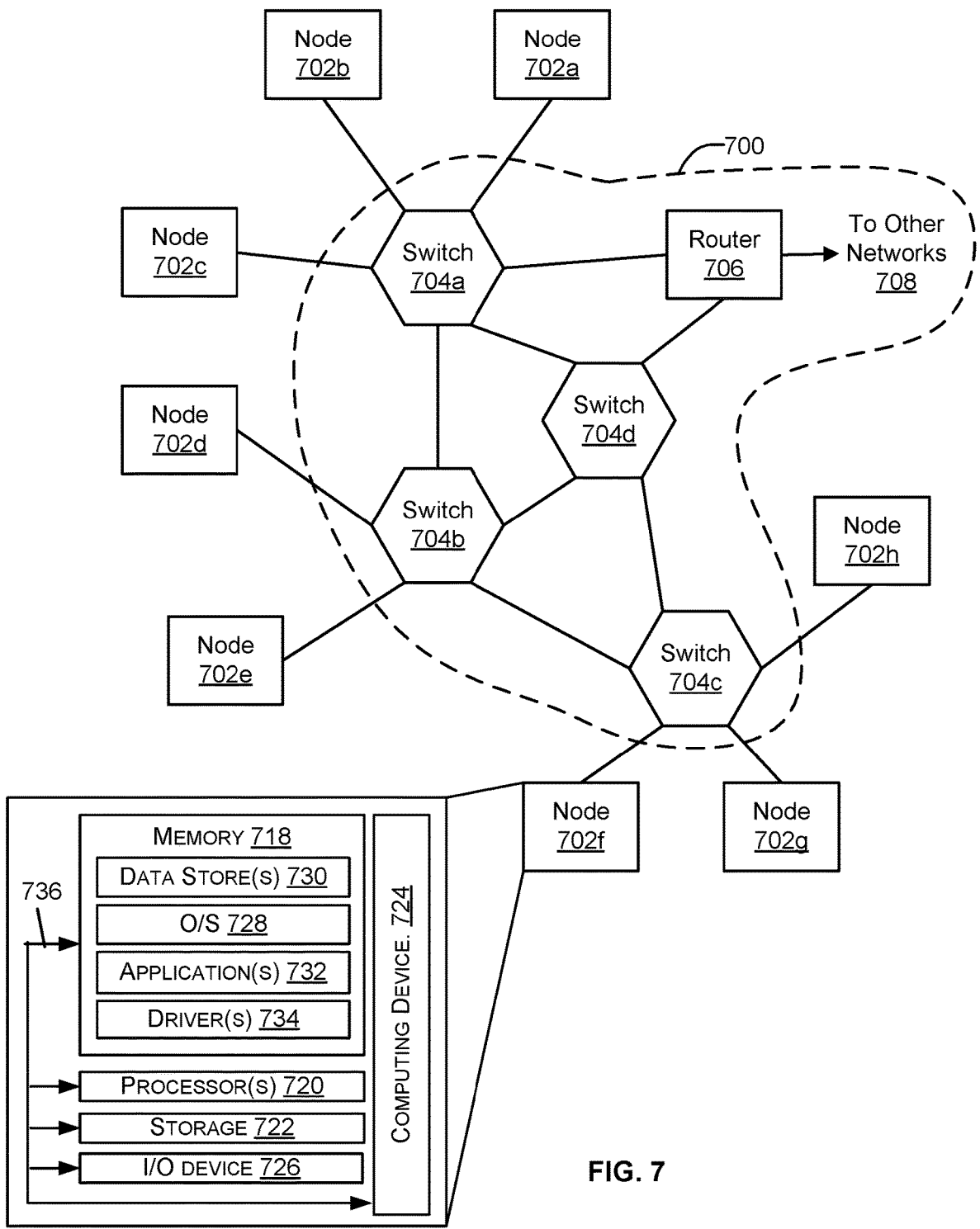
FIG. 7 illustrates an example architecture for features and systems described herein that includes one or more service provider computers and/or a user device connected via one or more networks, according to certain aspects of the disclosure.

FIG. 7 illustrates a network 700, illustrating various different types of computing devices 600 of FIG. 6, such as nodes comprising the computing device, switches and routers. In certain embodiments, the network 700 may be based on a switched architecture with point-to-point links. As illustrated in FIG. 7, the network 700 includes a plurality of switches 704a-704d, which may be arranged in a network. In some cases, the switches are arranged in a multi-layered network, such as a Clos network.

The network 700 may also include one or more computing devices 600 for connection with other networks 708, such as other subnets, LANs, wide area networks (WANs), or the Internet, and may be referred to as routers 706. Routers use protocols such as internet control message protocol (ICMP) to communicate with each other and configure the best route between any two devices.

In some examples, network(s) 700 may include any one or a combination of many different types of networks, such as cable networks, the Internet, wireless networks, cellular networks and other private and/or public networks. Interconnected switches 704a-704d and router 706, if present, may be referred to as a switch fabric, a fabric, a network fabric, or simply a network. In the context of a computer network, terms "fabric" and "network" may be used interchangeably herein.

Nodes 702a-702h may be any combination of host systems, processor nodes, storage subsystems, and I/O chassis that represent user devices, service provider computers or third party computers.

User devices may include computing devices to access an application 732 (e.g., a web browser or mobile device application). In some aspects, the application 732 may be hosted, managed, and/or provided by a computing resources service or service provider. The application 732 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 708. Additionally, the user device(s) may be part of the distributed system managed by, controlled by, or otherwise part of the service provider computer(s) (e.g., a console device integrated with the service provider computers).

The node(s) of FIG. 7 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 732 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 702*a*-702*h* may include at least one memory 718 and one or more processing units (or processor(s) 720). The processor(s) 720 may be implemented in hardware, computer-executable instructions, firmware, or combinations thereof. Computer-executable instruction or firmware implementations of the processor(s) 720 may include computer-executable or machine-executable instructions written in any suitable programming language to perform the various functions described.

In some instances, the hardware processor(s) 720 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 718 may store program instructions that are loadable and executable on the processor(s) 720, as well as data generated during the execution of these programs. Depending on the configuration and type of the node(s) 702*a*-702*h*, the memory 718 may be volatile (such as RAM) and/or non-volatile (such as ROM, flash memory, etc.). The memory 718 may include an operating system 728, one or more data stores 730, one or more application programs 732, one or more drivers 734, and/or services for implementing the features disclosed herein.

The operating system 728 may support nodes 702*a*-702*h* basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 728 may also be a proprietary operating system.

The data stores 730 may include permanent or transitory data used and/or operated on by the operating system 728, application programs 732, or drivers 734. Examples of such data include web pages, video data, audio data, images, user data, and so on. The information in the data stores 730 may, in some implementations, be provided over the network(s) 708 to user devices 704. In some cases, the data stores 730 may additionally or alternatively include stored application programs and/or drivers. Alternatively or additionally, the data stores 730 may store standard and/or proprietary software libraries, and/or standard and/or proprietary application user interface (API) libraries. Information stored in the data stores 730 may be machine-readable object code, source code, interpreted code, or intermediate code.

The drivers 734 include programs that may provide communication between components in a node. For example, some drivers 734 may provide communication between the operating system 728 and additional storage 722, computing device 724, and/or I/O device 726. Alternatively or additionally, some drivers 734 may provide communication between application programs 732 and the operating system 728, and/or application programs 732 and peripheral devices accessible to the service provider computer. In many cases, the drivers 734 may include drivers that provide well-understood functionality (e.g., printer drivers, display drivers, hard disk drivers, Solid State Device drivers). In other cases, the drivers 734 may provide proprietary or specialized functionality.

The service provider computer(s) or servers may also include additional storage 722, which may include removable storage and/or non-removable storage. The additional storage 722 may include magnetic storage, optical disks, solid state disks, flash memory, and/or tape storage. The additional storage 722 may be housed in the same chassis as the node(s) 702*a*-702*h* or may be in an external enclosure. The memory 718 and/or additional storage 722 and their associated computer-readable media may provide non-volatile storage of computer-readable instructions, data structures, program modules, and other data for the computing devices. In some implementations, the memory 718 may include multiple different types of memory, such as SRAM, DRAM, or ROM.

The memory 718 and the additional storage 722, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 718 and the additional storage 722 are examples of computer storage media. Additional types of computer storage media that may be present in the node(s) 702a-702h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 702a-702h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 702a-702h may also include I/O device(s) 726, such as a keyboard, a mouse, a pen, a voice input device, a touch input device, a display, speakers, a printer, and the like. The node(s) 702a-702h may also include one or more communication channels 736. A communication channel 736 may provide a medium over which the various components of the node(s) 702a-702h can communicate. The communication channel or channels 736 may take the form of a bus, a ring, a switching fabric, or a network.

The node(s) 702a-702h may also contain computing device(s) 724 that allow the node(s) 702a-702h to communicate with a stored database, another computing device or server, user terminals and/or other devices on the network(s) 700. The computing device(s) 724 of FIG. 7 may include similar components discussed with reference to the computing device 600 of FIG. 6.

In some implementations, the computing device 724 is a peripheral device, such as a PCI-based device. In these implementations, the computing device 724 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 608 may implement NVMe, and the computing device 724 may be connected to a computing system using a PCIe interface.

A PCI-based device may include one or more functions. A "function" describes operations that may be provided by the computing device 724. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the computing device 724 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 6, FIG. 7, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (e.g., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit, comprising:
    completer devices;
    requester devices configured to generate transactions to the completer devices, each transaction comprising a request packet;
    an interconnect fabric coupled to the requester devices and the completer devices and including distributed shared cache memory operable to queue transactions moving through the interconnect fabric, wherein the interconnect fabric is configured to transfer request packets of the transactions from the requester devices to the completer devices; and
    a quality of service (QoS) regulator configured to:
        intercept a first request packet sent from a first requester device to the interconnect fabric, the first request packet including a sequence of bits that represent values for one or more attributes, the one or more attributes including a first attribute identifying a first completer device of the completer devices, the first completer device being a device that will provide computing resources for servicing the first request packet;
        extract the first attribute from the first request packet;
        identify a first QoS value based on the first attribute, the first QoS value establishing a first priority level for the first request packet;
        modify the first request packet to include the first QoS value prior to sending the modified first request packet to the interconnect fabric in place of the first request packet, such that the interconnect fabric transfers the modified first request packet to the first completer device according to the first priority level;
        after intercepting the first request packet, intercept a second request packet including a second attribute identifying a second completer device of the completer devices, the second completer device being a completer device that is different from the first completer device and that will provide computing resources for servicing the second request packet;
        extract the second attribute from the second request packet;
        identify a second QoS value based on the second attribute, the second QoS value establishing a second priority level for the second request packet; and
        modify the second request packet to include the second QoS value prior to sending the modified second request packet to the interconnect fabric, such that the interconnect fabric transfers the modified second request packet to the second completer device according to the second priority level.

2. The integrated circuit of claim 1, wherein the QoS regulator comprises:
    an attribute extraction logic configured to receive the first request packet and extract the first attribute;
    a content addressable memory (CAM) or register-based matching logic coupled to the attribute extraction logic, the CAM or register-based matching logic being configured to identify, based on the first attribute, a first entry number linked to the first attribute;
    a QoS table coupled to the CAM or register-based matching logic, the QoS table storing information linking the first QoS value to the first entry number, wherein the QoS table is configured to identify the first QoS value based on the first entry number as provided to the QoS table by the CAM or register-based matching logic; and
    a QoS override logic coupled to the QoS table and configured to modify the first request packet to include the first QoS value as identified by the QoS table and to send the modified first request packet to the interconnect fabric.

3. The integrated circuit of claim 1, wherein the first completer device has different operating capabilities from the second completer device, and wherein the second priority level is different from the first priority level.

4. The integrated circuit of claim 3, wherein the first completer device is a dynamic random access memory (DRAM) device, the second completer device is a storage class memory (SCM) device, and the requester devices include a processor.

5. An integrated circuit, comprising:
a completer device configured to provide computing resources;
a requester device configured to generate transactions that can be serviced by the completer device using the computing resources, each transaction comprising a request packet, the request packet including a sequence of bits that represent values for one or more attributes, the one or more attributes including a first attribute identifying the completer device;
an interconnect fabric coupled to the requester device and the completer device, the interconnect fabric configured to route request packets to the completer device; and
a quality of service (QoS) regulator configured to:
intercept a first request packet sent from the requester device to the interconnect fabric;
identify, based on the first attribute in the first request packet, a first QoS value establishing a first priority level for the first request packet;
generate a modified first request packet corresponding to the first request packet modified to include the first QoS value;
send the modified first request packet to the interconnect fabric in place of the first request packet, wherein the completer device is a first completer device, and the QoS regulator is further configured to:
after intercepting the first request packet, intercept a second request packet including a second attribute identifying a second completer device different from the first completer device;
extract the second attribute from the second request packet;
identify a second QoS value based on the second attribute, the second QoS value establishing a second priority level for the second request packet; and
modify the second request packet to include the second QoS value prior to sending the modified second request packet to the interconnect fabric in place of the second request packet, such that the interconnect fabric transfers the modified second request packet to the second completer device according to the second priority level.

6. The integrated circuit of claim 5, wherein the QoS regulator is separate from the requester device and positioned between the requester device and the interconnect fabric.

7. The integrated circuit of claim 5, wherein the QoS regulator is integrated into the requester device so that the modified first request packet is sent from the requester device.

8. The integrated circuit of claim 5, wherein the first request packet further includes an original QoS value set by the requester device, and wherein to generate the modified first request packet, the QoS regulator is configured to replace the original QoS value with the first QoS value.

9. The integrated circuit of claim 5, wherein the QoS regulator is further configured to:
extract the first attribute from the first request packet; and
identify a first entry number based on the first attribute.

10. The integrated circuit of claim 9, wherein the QoS regulator comprises:
an attribute extraction logic coupled to the requester device and configured to receive the first request packet and extract the first attribute;
a content addressable memory (CAM) or register-based matching logic coupled to the attribute extraction logic, the CAM or register-based matching logic being configured to identify the first entry number based on the first attribute;
a QoS table coupled to the CAM or register-based matching logic and configured to store information linking the first QoS value to the first entry number so that the first QoS value can be identified based on the first entry number after the first entry number has been identified by the CAM or register-based matching logic; and
a QoS override logic coupled to the QoS table and configured to modify the first request packet to include the first QoS value.

11. The integrated circuit of claim 10, wherein the QoS override logic is configured to receive the first request packet from the requester device and the first QoS value from the QoS table.

12. The integrated circuit of claim 9, wherein the QoS regulator is further configured to identify the first entry number based on the first attribute in combination with a third attribute that also identifies the first completer device and that is included in the first request packet.

13. The integrated circuit of claim 5, wherein the interconnect fabric further comprises a point of coherency queue (POCQ) that dequeues request packets in a sequential order, the POCQ being implemented in cache memory that forms a portion of a distributed shared cache.

14. A method, comprising:
intercepting, by a quality of service (QoS) regulator of an integrated circuit, a first request packet sent from a requester device to an interconnect fabric, the first request packet including a sequence of bits that represent values for one or more attributes, the one or more attributes including a first attribute identifying a first completer device that will provide computing resources for servicing the first request packet;
extracting the first attribute from the first request packet;
identifying a first QoS value based on the first attribute, the first QoS value establishing a first priority level for the first request packet;
generating a modified first request packet corresponding to the first request packet modified to include the first QoS value;
outputting the modified first request packet to the interconnect fabric in place of the first request packet, such that the interconnect fabric transfers the modified first request packet to the first completer device according to the first priority level;
intercepting, by the QoS regulator of the integrated circuit, a second request packet sent from the requester device to the interconnect fabric, the second request packet including a second attribute identifying a second completer device, the second completer device being a completer device that is different from the first completer device and that will provide computing resources for servicing the second request packet;
extracting the second attribute from the second request packet;
identifying a second QoS value based on the second attribute, the second QoS value establishing a second priority level for the second request packet;
generating a modified second request packet corresponding to the second request packet modified to include the second QoS value; and
outputting the modified second request packet to the interconnect fabric in place of the second request packet, such that the interconnect fabric transfers the modified second request packet to the second completer device according to the second priority level.

15. The method of claim 14, wherein generating the modified first request packet includes inserting the first QoS value into the first request packet.

16. The method of claim 14, wherein the first request packet further includes an original QoS value set by the requester device and generating the modified first request packet is performed by replacing the original QoS value with the first QoS value.

17. The method of claim 14, wherein extracting the first attribute from the first request packet includes extracting a page attribute indicating a memory type of the first completer device or extracting a memory address corresponding to a destination in the first completer device for the first request packet.

* * * * *